United States Patent [19]

McArthur

[11] 4,039,471
[45] Aug. 2, 1977

[54] PROCESS FOR REJUVENATING AUTOMOBILE EMISSION CONTROL CATALYSTS

[75] Inventor: Dennis P. McArthur, Yorba Linda, Calif.

[73] Assignee: Union Oil Company of California, Los Angeles, Calif.

[21] Appl. No.: 640,645

[22] Filed: Dec. 15, 1975

[51] Int. Cl.² .......................... B01J 23/96; B01J 23/94
[52] U.S. Cl. .................................. 252/412; 423/213.5
[58] Field of Search ........................ 252/412, 413, 411; 423/213.5, 213.2, 213.7

[56] References Cited

U.S. PATENT DOCUMENTS

| | | | |
|---|---|---|---|
| 2,867,497 | 1/1959 | Houdry et al. | 252/413 |
| 3,025,133 | 3/1962 | Robinson et al. | 423/213.7 |
| 3,072,457 | 1/1963 | Bloch | 423/213.7 |
| 3,072,458 | 1/1963 | Page | 423/213.7 |
| 3,983,052 | 9/1976 | McArthur | 252/412 |

FOREIGN PATENT DOCUMENTS 679,955  2/1964  Canada ............................ 252/413

*Primary Examiner*—Winston A. Douglas
*Assistant Examiner*—P. E. Konopka
*Attorney, Agent, or Firm*—Gregory F. Wirzbicki; Lannas S. Henderson; Richard C. Hartman

[57] ABSTRACT

A method for the rejuvenation of an automobile emission control catalyst poisoned with deposited compounds of lead and/or phosphorus is disclosed, said method comprising (a) initially extracting some of the poison compounds from the catalyst with a select aqueous ammonium or acetate salt (preferably ammonium acetate) solution; (b) exposing the catalyst to a reducing atmosphere at 300° to 700° C., and finally (c) removing at least a portion of the poison compounds by a second extraction with a select aqueous ammonium or acetate salt solution. Catalysts contemplated for rejuvenation herein include those comprising nickel, palladium, rhodium, platinum, or combinations thereof as active components on bases of alumina or aluminum borate.

16 Claims, No Drawings

PROCESS FOR REJUVENATING AUTOMOBILE EMISSION CONTROL CATALYSTS

Background and Brief Summary of the Invention

This invention relates to the rejuvenation or reactivation of deactivated automobile emission control catalysts. More particularly, it relates to the rejuvenation of such catalysts by at least partially removing lead and/or phosphorus compounds from the surfaces thereof.

Much research has been conducted to discover a method for reducing the air pollutants in the exhaust gas of automobile engines. At the present time it is thought that the most feasible method involves, or will involve, the utilization of some form of catalytic converter. This device generally operates in two stages, the first to reduce $NO_x$ compounds to nitrogen, and the second to oxidize CO to $CO_2$ and hydrocarbons to $CO_2$ and $H_2O$.

Several combinations of catalysts are known in the art which can achieve the desired activity and selectivity for $NO_x$ conversion in the first stage and for the oxidation of CO and hydrocarbon gases in the second. Despite their relatively high cost, preferred catalysts comprise rhodium, with or without added nickel, on bases of alumina or aluminum borate for the $NO_x$ reduction stage, and platinum and/or palladium on similar bases for the CO/hydrocarbon oxidation catalyst. When exposed to exhaust gases containing even very minor amounts of compounds of lead and/or phosphorus, these catalysts eventually become deactivated due to contaminant poisoning. This usually occurs after about 20,000 miles of engine operation, or sooner if the engine is not operated exclusively on Federally Certified gasoline (a maximum of 0.05 of Pb and 0.005 g P per gallon).

Research into the nature of the contaminant poisons reveals that the chemical compounds responsible for catalyst deactivation are derived from the compounds of Pb, P and S present in the gasoline, P, S, Zn, Ca, Mg and Ba present in motor oil and Fe, Cu, Cr and Ni present in the metals composing the engine. The catalytic poisons other than compounds of P, S and Pb generally deactivate the catalysts only when present in large amounts, the primary mechanism of their deactivation being by inhibiting the diffusion rate of the exhaust gas to the catalyst surface and by shielding the active catalytic sites. Lead, sulfur and phosphorus, which deposit mainly as the compounds, PbO, $PbO_2$, $nPbO.PbCl_2$, $nPbO.PbBr_2$, $3Pb_3(PO_4)_2.PbCl_2$ (or $Br_2$), $PbO.Pb_3(PO_4)_2$, $PbSO_4$, $PbCl_2$, $PbBr_2$, $nPbO.PbSO_4$ and $Pb_3(PO_4)_2$ are known rapidly to deactivate the noble metal catalysts when as little as 0.3 to 8 percent by weight, determined as elemental P and/or Pb, of such compounds deposit thereon. A major problem confronting industry lies in developing effective and economical methods for rejuvenating such poisoned catalysts. To date, no such method has been developed.

It has now been found that the contaminant poisons of lead and phosphorus can be removed from $NO_x$ reduction and CO/hydrocarbon oxidation catalysts, thereby effectively regenerating said catalysts, by the three-step process of subjecting such catalysts to (1) an optional extraction of some of the poisons with an an aqueous solution of one or more select ammonium and/or acetate salts, (2) reduction in an atmosphere preferably containing $H_2$ and/or CO, and (3) extraction once again with an aqueous solution of one or more select ammonium and/or acetate salts. In addition to lead and phosphorus, it has also been found that other deposited contaminant poisons of Fe, Zn, Mg, Ca, etc., are removable by the process of the invention. Catalytic rejuvenation in the manner described herein recovers between 50 and 75% or more of the activity loss attributable to contaminant poisoning.

A somewhat perplexing aspect of the invention resides in the determination of the function of the reduction step. While the function of the extractions of steps (1) and (3) is primarily to dissolve soluble lead salts, the function of the reduction step is largely unknown. As will be shown hereinafter, it does tend to convert those lead components unextractable in step (1) to a form or forms extractable by the same treatment in step (3). It also seems to be of benefit when phosphorus compounds, e.g., $Pb_3(PO_4)_2$, which are highly stable under most circumstances, are present in amounts which significantly affect the activity of the catalyst. But the exact mechanism by which these two results are achieved is not known.

DETAILED DESCRIPTION OF THE INVENTION

This invention is designed to rejuvenate automobile emission control catalysts which have been deactivated by the deposition of compounds of lead, phosphorus, and other poisons on their surfaces. It is not designed to rejuvenate catalysts whose loss of activity is due to thermal degradation or volatilization of the active metal components.

When the total lead compounds are present in quantities as little as 0.3 to 8 percent (as Pb) of catalyst weight, they can be primarily responsible for most of the overall deactivation. However, it is generally known in the art that lead sulfate is one of the primary deactivants for most automobile emission control catalysts, whether they contain noble metal or base metal active components. Lead sulfate may comprise from about 1% to about 60% by weight of the total deposited lead compounds; the remainder will be in various forms or combinations of PbO, $PbO_2$, $Pb_3(PO_4)_2$, and $nPbO.PbCl_2$ (or $Br_2$). Therefore, in the rejuvenation technique of the invention primary emphasis is directed to the removal by dissolution of lead sulfate, and secondary importance is assigned to the dissolution of what can be termed the secondary lead and phosphorous deactivants, PbO, $Pb_3(PO_4)_2$, etc. It should be noted, however, that one of the unique aspects of the invention is that it has been found to be particularly useful when the deactivation of the catalyst is due to the presence of significant amounts of phosphorus compounds (i.e., usually in excess of 0.3 wt.% (as P) of the deactivated catalyst).

The catalysts which can be rejuvenated by the process of this invention include those presently utilized either for $NO_x$ reduction or CO/hydrocarbon oxidation. More definitively, the invention contemplates regeneration of supported catalysts containing one or more Group VIII metals, preferably one or more Group VIII noble metals, alone or with other transitional metals of the Periodic Table. The support can be any of those well known in the art which comprise a major proportion of porous, thermally stable material. Included herein are such refractory oxide supports as carborundum, alpha alumina, delta alumina, gamma alumina, zirconia, mullite, cordierite, aluminum phosphate, aluminum borate, etc. Crystalline aluminum borates of the type described in my U.S. Pat. No. 3,856,705 are especially preferred. Such support materials can be made by any conventional method and can be shaped into suitable granular forms by pelleting, extruding, prilling or the like.

Catalysts especially contemplated for CO/hydrocarbon oxidation are those containing Pd-Pt or Pt-Rh on a cordierite ceramic substrate which has been pre-coated with a stabilized alumina or aluminum borate wash coating. One especially preferred for $NO_x$ reduction comprises Ni-Rh on an aluminum borate coated cordierite monolithic substrate.

In the first step of the invention an aqueous solution of one or more select ammonium or acetate salts is utilized primarily (it is believed) to dissolve lead sulfate. The salts contemplated for use herein are any of those selected from the class consisting of ammonium acetate, ammonium citrate, ammonium tartrate, ammonium carbonate, ammonium sulfate, ammonium nitrate, ammonium chloride, sodium acetate, calcium acetate, potassium acetate, magnesium acetate and combinations thereof.

In general, however, it is preferred to utilize salts such as ammonium acetate, ammonium citrate, ammonium tartrate, sodium acetate, etc., which, even in concentrated aqueous solution are substantially neutral or slightly basic, yielding pH's between about 6 and 9.6. These salts are relatively nontoxic, noncorrosive and nonflammable; as a result, they can be safely used with no special industrial equipment being necessary for their handling. Ammonium acetate is particularly useful in this regard, and is a remarkably efficient solvent for lead sulfate. Also, as will be shown in Examples I and II hereinafter, it use in the process of the invention produces significant increases in the activity of severely deactivated catalysts. For these reasons, it is by far the preferred ammonium salt.

The method by which a deactivated catalyst is contacted with the aqueous ammonium salt solution is not critical, and may depend upon the resources available. Simple soaking is the cheapest method, especially if the catalyst is easily separated from its container. However, this technique suffers from the fact that dissolved lead compounds may concentrate near the catalyst surface, thus inducing localized saturation which impedes the dissolution of remaining undissolved lead compounds. In the preferred method of operation, therefore, advantage is taken of the fact that agitation of the solvent by means of a recycle pump continuously removes dissolved lead compounds from the vicinity of the catalyst, thus eliminating the problems associated with localized saturation. Recycling of the select aqueous ammonium and/or acetate salt solution by means of a suitable pumping arrangement also has the advantage of being the method most practical for regenerating the catalysts in situ — that is, without having to remove them from either the automobile or their encapsulating container.

The aqueous salt solutions herein contemplated can be employed in concentrations ranging from extremely dilute, e.g., 0.1 M, to saturated, and in the temperature range from ambient to boiling (20°-115° C.). Preferably, however, concentrations between about 2 and 10 M, and temperatures near or at the boiling point, preferably between about 70° and 115° C, are utilized. Despite the severity of such treatment, damage to the catalysts is usually minimal. Thus, although it is within the scope of the invention to perform the extraction with a cold dilute aqueous solution of the one or more select ammonium or acetate salts, better results are achieved at higher temperatures with more highly concentrated solutions.

The time during which the catalyst is contacted with the aqueous ammonium and/or acetate salt solution can range from about 10 minutes to 3 to 4 days. It has been discovered, however, that little advantage is realized in prolonging the contacting beyond about 3 hours at temperatures of 80°-115° F. This is especially true when concentrated solutions are used. The preferred mode of operation involves immersion in the aqueous ammonium salt solution for about 1-5 hours, with or without recycling.

After a thorough rinsing of the catalyst, preferably with dilute acetic acid or distilled or deionized water, followed by drying, it is found that substantial removal of contaminant metals and restoration of catalytic activity are effected. (It is noted herein that this rinsing is only for the purpose of removing residual extraction solution and hence is only desirable, and not necessary, in the practice of the invention.) However, in order to remove more contaminants and recover even more activity, it is preferred to subject the extracted catalyst to a reduction treatment.

As broadly conceived, this reduction treatment contemplates exposing the catalyst to an atmosphere containing (in addition to inert gases and/or insubstantial quantities of oxidizing gases) $H_2$ and/or CO as the essential active reducing component or components at elevated temperatures between 200° and 800° C., preferably between about 300° and 700° C., for a time period between about 10 minutes and 3 to 4 days, but preferably for about 1-5 hours. This treatment can be accomplished in several ways. For instance, in the preferred manner the catalyst can simply be enclosed in an appropriate pressure vessel (e.g., its original container) into which the $H_2$ and/or CO are passed, and heated to 300° to 700° C. under autogenous pressure. Alternatively, the reducing gas can be heated by external means, then passed over the catalyst at some convenient space velocity, usually between about 2 and 200 GHSV, and finally discharged to the atmosphere or, in the alternative, recycled over the catalyst again.

Although it may be possible to achieve adequate reactivation of the deactivated catalysts by utilizing a reducing gas consisting of less than 10 vol. % of the essential active reducing components, it is strongly preferred that the reducing gas contain at least 50 vol. % of said essential active reducing components of $H_2$ and/or CO. Even more preferably, a reduction gas consisting of only $H_2$ as the essential active component, said $H_2$ being in proportions exceeding at least 50 vol. % of the entire reducing gas, should be used in the reduction step. Moreover, oxidizing gases such as $O_2$, $SO_2$, $SO_3$, etc., should not be present in the reducing gas in proportions greater than about 25% of the proportion of $H_2$ + CO in said reducing gas.

As previously stated, the purpose or function of the reduction step as described is largely unknown. As shown in Examples II & III hereinafter, it does tend to convert some lead poisons, including those containing phosphorus, into compounds which are then extractable by dissolution in select aqueous ammonium and/or acetate salt solutions. Additionally, there is some evidence that for those catalysts which have been deactivated with 0.3 wt. % or more of phosphorus compounds (as P), the reduction step aids in removing the phosphorus therefrom by chemical conversion to one or more gaseous components. Presumably, when $H_2$ is used as a component of the reducing gas, the phosphorus is removed as gaseous $PH_3$ and the original phosphorus compound (i.e., usually Pb$_3$(PO$_4$)$_2$) is decomposed to a lead oxide. When CO is present as a major component of the essential active reducing components, then some of the phosphorus may be removed as gaseous P$_2$O$_5$.

After reduction of the catalyst by any of the aforementioned means or their obvious equivalents has been accomplished, the catalyst is subjected to a second aqueous ammonium salt solution extraction as previously described primarily to remove soluble compounds of lead and phosphorus formed during the reduction process. At the conclusion of the second extraction, the catalyst is freed of a sufficient amount of compounds of lead, sulfur and phosphorus so that a substantial portion of its lost activity is regained. Significant amounts of iron, magnesium, calcium, zinc, etc., are also removed, although the exact mechanism for their removal is not clearly understood.

While the invention basically contemplates the three-step process outlined thus far, the technique of reduction followed by aqueous ammonium and/or acetate salt solution extraction can be repeated any number of times thereafter, with each cycle usually improving the activity of the catalyst by removing more poisons. It is also within the contemplated scope of the invention to eliminate the first aqueous ammonium and/or acetate salt solution extraction and to rely exclusively on the reduction step followed by an aqueous ammonium and/or acetate salt solution extraction, or series of such reduction-extraction cycles. Excellent results may be so obtained. It also lies within the scope of the invention to perform each extraction step by contacting the catalyst with more than one of the select salt solutions; however, as shown in Example II hereinafter, little advantage is realized in subjecting the deactivated catalysts to such additional contactings.

The following examples are presented to illustrate the invention but are not to be necessarily construed as being limiting in scope.

EXAMPLE I

Two cylindrical (½ inch diameter × 3 inch length) samples, No. 1690C and No. 1610C, of the same commercial monolithic CO/hydrocarbon oxidation catalyst (Pd-Pt-Al$_2$O$_3$, 0.1-0.3 wt.% total active metals impregnated on a cordierite support pre-coated with a stabilized alumina wash coating) were subjected to accelerated lead poisoning by processing the exhaust gases from a single cylinder laboratory engine dynamometer operating with fuel containing 6.3 g Pb/gal. The samples, weighing about 7 gm, were used in series to process all the exhaust gas produced by the engine for 75 minutes. As shown in Table I both samples were substantially deactivated by the treatment.

The catalyst samples were then subjected to a solvent extraction treatment in which 12.3 liters of aqueous ammonium acetate (750 g. reagent grade NH$_4$C$_2$H$_3$O$_2$ per liter of deionized water) solution at 94° C were circulated through the catalyst samples at a rate of 120 LHSV, first for 4 hrs., and then for 7 hrs. after a period during which the two samples remained in stagnant contact with the solution for 16 hrs. After being rinsed by circulation with 3 gallons of dilute acetic acid (250 ml reagent grade glacial acetic acid per 3 gal. of deionized water) for one-half hrs. at 80°-90° C and 120 LHSV, the samples were oven dried at 110° C.

Following the extraction with the ammonium acetate solution and the oven drying, the two samples were then subjected to a reduction treatment. A gas consisting of 55% (by volume) H$_2$ and 45% N$_2$ was passed at 1100° F, 1 atm and 250 GHSV over the catalyst for two hours. For the next 16 hours this same gas stream (at room temperature) was used to reduce the temperature of the catalyst to ambient.

The samples were then subjected to a second solvent extraction treatment similar to the first solvent extraction except that the total contact time was only 5 hours, during which time the aqueous ammonium acetate solution was constantly circulated. The samples were then oven dried at 110° and then activity tested. The results shown in Table I demonstrate that the lost activity (as measured by the percent conversion of CO and gross hydrocarbons to CO$_2$ and CO$_2$ and H$_2$O, respectively) of the poisoned catalyst was almost completely restored by this rejuvenation process.

TABLE I

| | % Conversion* at 1000° F Catalyst Sample | | | |
|---|---|---|---|---|
| | No. 1690C | | No. 1610C | |
| Determination of Catalyst Activity | CO | Gross HC | CO | Gross HC |
| Initially (Fresh) | 89.5 | 67.1 | 88.1 | 67.1 |
| After Poisoning | 45.7 | 28.4 | 31.3 | 19.4 |
| After Rejuvenation | 84.8 | 64.6 | 82.1 | 63.2 |

*CO converted to CO$_2$ and HC converted to CO$_2$ + H$_2$O.

EXAMPLE II

A Pt-Pd-Al$_2$O$_3$ HC/CO oxidation catalyst (0.1-0.3 wt.% total active metals impregnated on a monolithic cordierite support precoated with a stabilized alumina wash coating) was motor vehicle tested using a commercial leaded fuel (2.24g Pb/gal) and a fully formulated engine oil. After the motor vehicle had been run for 2,690 and 4,405 miles, activity tests showed that the activity of the catalyst under conditions of simulated cruise (0.2% CO in exhaust gas) and simulated acceleration (2.0% CO in exhaust gas) had deteriorated as shown in Table II. The entire monolithic catalyst weighed ~1500 gm.

Six liters of aqueous ammonium acetate solution (750g of reagent grade NH$_4$C$_2$H$_3$O$_2$ per liter of water) were circulated through the converter (container plus catalyst). The circulation was conducted at a temperature between 94°-98° C for 1 hour at a rate of 2.1 l/min (60 LHSV). The catalyst was then flushed by circulation with 8 liters of hot (~90° C), deionized water for 1 hour at a rate of 2.1 l/min (60 LHSV). This 1 hour solvent extraction - 1 hour water rinse was repeated 7 times, each time identically as the first and each time with fresh solvent solution and fresh deionized water. The amounts of contaminants removed by each of these eight treatments are shown in Table III.

Following the eight extractions with ammonium acetate, the catalyst was then subjected to a reduction treatment. A gas consisting of 79% (by volume H$_2$) and 21% N$_2$ was passed at 1100° F, 1 atm and 65 GHSV through the converter for 2 hours. For the next 16 hours this same gas stream (at room temperature), was used to lower the temperature of the catalyst to 190° C, after which the catalyst was allowed to cool in air to ambient temperature.

The catalyst was then subjected to two solvent extraction - hot water rinses as previously described, except that the time of the first solvent extraction was reduced to 0.5 hr, and both water rinses were carried out with three one hour, 8-liter, hot water flushes. The amounts of contaminants removed by these final two treatments and the total amount of comtaminants (including the solids removed by all the extractions) removed by the entire rejuvenation process are shown in Table III. Also, as shown in Table II, the activity of the catalyst (as tested by the method described in Example I) after a final air calcination at 500° C for 1 hour was essentially that of the fresh catalyst.

TABLE II

| Determination of Catalyst Activity After: | % Gross Conversion at 1000° F | | | |
|---|---|---|---|---|
| | Simulated Acceleration* (2% CO) | | Simulated Cruise* (0.2% CO) | |
| | HC | CO | HC | CO |
| 0 miles | 85.0 | 95.6 | 81.1 | 93.5 |
| 2690 miles | 28.0 | 21.9 | 23.4 | 37.3 |
| 4405 miles | 10.4 | 25.2 | 20.7 | 33.9 |
| Rejuvenation | 84.7 | 98.2 | 78.6 | 97.2 |

*Simulated cruise and simulated acceleration, as used herein, refer to the sustained operation of the motor vehicle engine such that the untreated exhaust gas therefrom contains, by volume, 0.2% CO and 2.0% CO, respectively.

TABLE III

| | Amount of Contaminant Removed | | | | |
|---|---|---|---|---|---|
| | Calcium Grams | Iron Grams | Lead Grams | Phosphorus Grams** | Zinc Grams |
| Pre-Reduction Extractions | | | | | |
| 1st | 0.035 | 0.005 | 98.800 | 0.026 | 0.039 |
| 2nd | 0.017 | 0.002 | 4.480 | 0.002 | 0.010 |
| 3rd | 0.009 | 0.003 | 1.405 | 0.000 | 0.007 |
| 4th | 0.007 | 0.003 | 1.466 | 0.000 | 0.005 |
| 5th | 0.010 | 0.001 | 0.805 | 0.000 | 0.006 |
| 6th | 0.009 | 0.001 | 0.449 | 0.000 | 0.004 |
| 7th | 0.002 | 0.000 | 0.252 | 0.000 | 0.002 |
| 8th | 0.004 | 0.002 | 0.367 | 0.000 | 0.004 |
| Post-Reduction Extractions | | | | | |
| 1st | 0.014 | 0.005 | 1.440 | 0.000 | 0.012 |
| 2nd | 0.006 | 0.004 | 0.221 | 0.000 | 0.006 |
| Solids Removed* | 0.018 | 2.450 | 3.578 | 0.056 | 0.026 |
| Total Wt | 0.131 | 2.476 | 111.858 | 0.084 | 0.121 |
| % of All Contaminants | 0.1 | 2.2 | 97.5 | <0.1 | 0.1 |

*Total solids recovered by filtration of all pre- and post- reduction extractions.
**Phosphorus removal data does not include that which was removed as one or more gaseous components.

EXAMPLE III

Two entire Pt-Pd-$Al_2O_3$ (0.1-0.3 wt.% total active metals impregnated on a cordierite support pre-coated with a stabilized alumina wash coating) HC/CO oxidation monolithic catalytic converters, No. 339 and No. 387, weighing 1092 gm and 1566 gm, respectively, were subjected to dynamometer endurance testing using certification fuel (i.e., 0.05 Pb and 0.005 P) and fully formulated engine oil. The aging cycle of the two converters was as follows: 48 minutes at 3310 rpm (for No. 387) and 2410 rpm (for No. 339), 12 minutes idle, 48 minutes at high speed again, 12 minutes idle and 10 minutes of engine shut-off. This aging cycle was repeated for a time period in excess of 400 hours, after which time it was known that the converters were permanently deactivated by thermal degradation. However, to demonstrate the effectiveness of the process for removing catalytic poisons the converters were subjected to the following treatments:

Converter No. 339

About 12.3 liters of ammonium acetate solution (750 g reagent grade $NH_4C_2H_3O_2$ per liter of deionized water) were circulated through the catalyst at temperatures between 80° and 95° F for 5¾ hours. The flow rate of the solution was 2.1 liters/min (1.3 LHSV). The catalyst was then allowed to sit in the stagnant solution overnight, after which time the circulation was continued as before for 3¾ hours. About 12.3 liters of deionized water were then circulated through the catalyst for 1 hour at 85° F at the rate of 1.0 liters/min (0.062 LHSV). The catalyst was the oven dried overnight at 110° C.

Following the extraction with the ammonium acetate solution and the oven drying, the two catalysts were then subjected to a reduction treatment. A gas consisting of 55% (by volume) $H_2$ and 45% $N_2$ was passed at 1100° F, 27 GHSV and 1 atm over the catalyst for two hours. For the next 16 hours this same gas stream (at room temperature) was used to lower the temperature of the catalyst to about 300°-400° F.

The catalyst was then subjected to a second solvent extraction treatment similar to the first except that the total contact time was 1.5 hours, during which time the aqueous ammonium acetate solution was constantly circulated. The catalyst was then flushed by circulating 12.3 liters of dilute acetic acid (40 ml of reagent grade glacial acetic acid per liter of deionized water) through the converter at 80° - 85° F for 0.5 hours at 2.1 liters/min. The catalyst was subsequently flushed again by circulating 12.3 liters of dilute acetic acid (81 ml of reagent grade glacial acetic acid per liter of deionized water) at 80° - 95° F for 3.5 hours at 2.1 liters/minute. The catalyst was finally rinsed by circulating 12.3 liters of deionized water at 85° F for 0.5 hours at 2.1 liters/minute and then oven dried overnight at 110° C.

Converter No. 387

About 12.3 liters of ammonium acetate solution (750 g reagent grade $NH_4C_2H_3O_2$ per liter of deionized water) were circulated through the converter at a temperature of 85° F for 7 hours at a flow rate of 2.1 liters/min (0.95 LHSV). The catalyst was then flushed by circulating a dilute solution of ammonium acetate (38 g reagent grade $NH_4C_2H_3O_2$ per liter of deionized water) for 2 hours under conditions similar to the previous ammonium acetate extraction. The catalyst was then rinsed with 12.3 liters of deionized water at 85° F for 15 minutes at 2.1 liter/minute.

Following the extraction with the ammonium acetate solution and the water rinse, the two catalysts were then subjected to a reduction treatment. A gas consisting of 55% (by volume) $H_2$ and 45% $N_2$ was passed at 600° C and 1 atm over the catalyst for two hours. The space velocity of the gas was 23 GHSV. For the next 16 hours this same gas stream (at room temperature) was used to lower the temperature of the catalyst to about 300°-400° F.

The catalyst was then subjected to two successive solvent extraction treatments similar to the first except that both extractions were conducted for only 2 hours. The catalyst was then water flushed as before except that the water was circulated for a full hour. Next, the catalyst was rinsed in succession with three separate solutions of acetic acid. The first solution contained 22 ml of reagent grade glacial acetic acid per liter of deionized water, the second, 67 ml, and the third, 63 ml. About 12.3 liters of each of the aforesaid solutions were used per rinse and the rinses were conducted by circulating the solutions for 0.5 hours at 80-85° F and at 2.1 liters/min. A final water washing similar to the first was then performed. The catalyst was then oven dried at 110° C for 3 hours.

As expected, neither catalyst was found to have demonstrated any improvement in activity as a result of the rejuvenation treatment but, as shown in Table IV, a substantial amount of total poisons, especially those of phosphorus, was removed. These phosphorus removal data are particularly noteworthy inasmuch as phosphorus poisons, especially $Pb_3(PO_4)_2$, are notoriously stable and generally not considered readily removable from deactivated catalysts. Also it should be noted that over 70% of the phosphorus (as shown in Table V) was removed from each catalyst after the reduction treatment. This tends to confirm the conclusion that the reduction treatment converts the phosphorus poisons to a form dissolvable by the subsequent ammonium acetate treatment.

TABLE IV

|  | Amount of Contaminant Removed, Grams | | Percent of Total Contaminants Removed | |
|---|---|---|---|---|
|  | No. 339 | No. 387 | No. 339 | No. 387 |
| Aluminum | 0.128 | 0.104 | 0.5 | 0.4 |
| Barium | 0.373 | 1.113 | 1.4 | 4.6 |
| Calcium | 0.087 | 0.443 | 0.3 | 1.8 |
| Chromium | 0.114 | 0.252 | 0.4 | 1.1 |
| Iron | 10.590 | 4.932 | 39.3 | 20.5 |
| Magnesium | 0.240 | 0.327 | 0.9 | 1.4 |
| Phosphorus* | 5.714 | 8.501 | 21.2 | 35.3 |
| Lead | 8.915 | 7.817 | 33.1 | 32.4 |
| Zinc | 0.817 | 0.625 | 3.0 | 2.6 |
| Total Weight | 26.978 | 24.114 | | |

*Note:
Data for phosphorus removal does not include that which may have been removed as one or more gaseous components during the hydrogen reduction step.

TABLE V

| | Percent* of Individual Contaminant Removed from Catalyst 339 by Each Step | | | | |
|---|---|---|---|---|---|
| Treatment | Ba | Fe | P | Pb | Zn |
| 1st $NH_4C_2H_3O_2$ Extraction | 70 | 9 | 26 | 72 | 85 |
| 1st Water Flush | NA | 0 | NA | 0 | NA |
| 2nd $NH_4C_2H_3O_2$ Extraction | 24 | 15 | 32 | 3 | 8 |
| 1st Acetic Acid Flush | 7 | 3 | 40 | 4 | 2 |
| 2nd Acetic Acid Flush | NA | 70 | 1 | 16 | 6 |
| Final Water Flush | NA | 3 | 0 | 6 | NA |

| | Percent* of Individual Contaminant Removed from Catalyst 387 by Each Step | | | | |
|---|---|---|---|---|---|
| Treatment | Ba | Fe | P | Pb | Zn |
| 1st $NH_4C_2H_3O_2$ Extraction | 18 | 27 | 29 | 87 | 62 |
| $NH_4C_2H_3O_2$ Rinse | NA | 2 | NA | 0 | NA |
| 2nd $NH_4C_2H_3O_2$ Extraction | 54 | 38 | 50 | 5 | 24 |
| 3rd $NH_4C_2H_3O_2$ Extraction | 27 | 9 | 9 | 2 | 6 |
| 2nd Water Rinse | 1 | 5 | 5 | 0 | NA |
| 1st Acetic Acid Rinse | NA | 3 | 3 | 1 | NA |
| 2nd Acetic Acid Rinse | NA | 11 | 2 | 4 | 5 |
| 3rd Acetic Acid Rinse | NA | 5 | 1 | NA | 3 |

NA = No Analysis
*Percent of total amount removed; not the total amount present on the catalyst.

It will be appreciated by those skilled in the art that the reactivation method described herein, and illustrated in the Examples herein, will produce different results with different catalysts. Those catalysts whose deactivation is due primarily to thermal degradation or loss of active metal components by volatilization will generally not be re-activated by the process of the invention. Additionally, the degree of reactivation achievable by the process of the invention on any individual catalyst will be dependent upon such factors as the manner of deactivation (i.e., whether over a long or short period of time), the nature and quantity of the deactivants on the catalyst and, most especially, on the nature of the catalyst itself. In particular, variable results have been achieved with catalysts supported on alumina wash coats containing cesium stabilizers.

While the invention has been described in conjunction with specific embodiments thereof, it is evident that many alternatives and variations will be apparent to those skilled in the art in light of the foregoing description. Accordingly, it is intended to embrace all such alternatives and variations that fall within the spirit and scope of the appended claims.

I claim:

1. A process for the rejuvenation of an automobile exhaust gas conversion catalyst comprising a Group VIII metal dispersed on a refractory oxide support, said catalyst having been previously utilized for the conversion of air pollutants in lead-containing and phosphorus-containing auto exhaust gases with resultant deposition thereon of deactivating solids comprising inorganic compounds of lead and phosphorus, which process comprises:
   a. contacting said catalyst with an aqueous ammonium and/or acetate salt solution of at least 0.1 M concentration at a temperature between about 20° C and the boiling point of said salt solution for at least about 10 minutes, said ammonium and/or acetate salt being selected from the class consisting of ammonium chloride, ammonium nitrate, ammonium sulfate, ammonium acetate, ammonium tartrate, ammonium citrate, ammonium carbonate, sodium acetate, potassium acetate, calcium acetate and magnesium acetate;
   b. contacting the catalyst from step (a) with a reducing gas for at least about 10 minutes at a temperature between about 200° and 800° C, said reducing gas comprising $H_2$ and/or CO as its essential active component; and
   c. contacting the reduced catalyst from step (b) with an aqueous ammonium and/or acetate salt solution as defined in step (a) and recovering therefrom said catalyst with at least some of said lead and phosphorus deactivating solids removed and in a substantially more active condition.

2. The process as defined in claim 1 wherein said contacting in steps (a) and (c) is carried out with an aqueous ammonium acetate solution, and said Group VIII metal is a noble metal.

3. The process as defined in claim 2 wherein said reducing gas comprises at least 50% by volume hydrogen.

4. The process as defined in claim 2 wherein said Group VIII metal is selected fom the class consisting of platinum, palladium, rhodium and mixtures thereof.

5. The process as defined in claim 4 wherein said refractory oxide support is selected from the class consisting of carborundum, alpha alumina, gamma alumina, delta alumina, zirconia, mullite, cordierite, alumina phosphate, aluminum borate and combinations thereof.

6. The process as defined in claim 2 wherein said refractory oxide support is selected from the class consisting of carborundum, alpha alumina, gamma alumina, delta alumina, zirconia, mullite, cordierite, aluminum phosphate, aluminum borate and combinations thereof.

7. A process for the rejuvenation of an automobile exhaust gas conversion catalyst comprising a Group VIII metal dispersed on a refractory oxide support, said catalyst having been previously utilized for the conversion of air polutants in auto exhaust gases containing lead and phosphorus compounds with resultant deposition thereon of deactivating solids comprising inorganic compounds of lead and phosphorus, which process comprises:
  a. contacting said catalyst with a reducing gas for at least about 10 minutes at a temperature between about 200° and about 800° C, said reducing gas comprising $H_2$ and/or CO as its essential active component;
  b. contacting the reduced catalyst from step (a) with an aqueous ammonium and/or acetate salt solution of at least about 0.1 M concentration at a temperature betwen about 20° C and the boiling point of said salt solution for at least about 10 minutes, said ammonium and/or acetate salt being selected from the class consisting of ammonium chloride, ammonium nitrate, ammonium sulfate, ammonium acetate, ammonium citrate, ammonium carbonate, sodium acetate, potassium acetate, calcium acetate and magnesium acetate, thereby removing at least some of said deactivating solids from said catalyst; and
  c. recovering said catalyst in a substantially more active condition.

8. The process as defined in claim 7 wherein said contacting in step (b) is carried out with an aqueous ammonium acetate solution.

9. The process as defined in claim 8 wherein said reducing gas comprises at least 50% by volume hydrogen.

10. The process as defined in claim 8 wherein said Group VIII metal is selected from the class consisting of platinum, palladium, rhodium and mixtures thereof.

11. The process as defined in claim 10 wherein said refractory oxide support is selected from the class consisting of carborundum, alpha alumina, gamma alumina, delta alumina, zirconia, mullite, cordierite, aluminum phosphate, aluminum borate and combinations thereof.

12. The process as defined in claim 8 wherein said refractory oxide support is selected from the class consisting of carborundum, alpha alumina, gamma alumina, delta alumina, zirconia, mullite, cordierite, aluminum phosphate, aluminum borate and combinations thereof.

13. A process for the rejuvenation of an automobile exhaust gas conversion catalyst comprising a Group VIII metal dispersed on a refractory oxide support, said catalyst having been previously utilized for the conversion of air pollutants in auto exhaust gases containing vaporized metallic constituents with resultant deposition thereon of deactivaing solids comprising lead and one or more metallic components selected from the class consisting of Ba, Fe, Ca, Zn, and compounds thereof, which process comprises:
  a. contacting said catalyst with an aqueous ammonium and/or acetate salt solution of at least 0.1 M concentration at a temperature between about 20° C and the boiling point of said salt solution for at least about 10 minutes, said ammonium and/or acetate salt being selected from the class consisting of ammonium chloride, ammonium nitrate, ammonium sulfate, ammonium acetate, ammonium tartrate, ammonium citrate, ammonium carbonate, sodium acetate, potassium acetate, calcium acetate, and magnesium acetate;
  b. contacting the catalyst from step (a) with a reducing gas for at least about 10 minutes at a temperature between about 200° and 800° C, said reducing gas comprising $H_2$ and/or CO as its essential active component; and
  c. contacting the reduced catalyst from step (b) with an aqueous ammonium and/or acetate salt solution as defined in step (a) and recovering therefrom said catalyst with at least some of said deactivating solids removed and in a substantially more active condition.

14. A process as defined in claim 13 wherein said contacting in steps (a) and (c) is carried out with an aqueous ammonium acetate solution.

15. A process for the rejuvenation of an automobile exhaust gas conversion catalyst comprising a Group VIII metal dispersed on a refractory oxide support, said catalyst having been previously utilized for the conversion of air pollutants in auto exhaust gases containing vaporized metallic constituents with resultant deposition thereon of deactivating solids comprising lead and one or more metallic constituents selected from the class consisting of Ba, Fe, Ca, Zn, and compounds thereof, which process comprises:
  a. contacting said catalyst with a reducing gas for at least about 10 minutes at a temperature between about 200° and about 800° C, said reducing gas comprising $H_2$ and/or CO as its essential active component;
  b. contacting the reduced catalyst from step (a) with an aqueous ammonium and/or acetate salt solution of at least about 0.1 M concentration at a temperature between about 20° C and the boiling point of said salt solution for at least about 10 minutes, said ammonium and/or acetate salt being selected from the class consisting of ammonium chloride, ammonium nitrate, ammonium sulfate, ammonium acetate, ammonium citrate, ammonium carbonate, sodium acetate, potassium acetate, calcium acetate, and magnesium acetate, thereby removing at least some of said deactivating solids from said catalyst; and
  c. recovering said catalyst in a substantially more active condition.

16. The process as defined in claim 15 wherein said contacting in step (b) is carried out with an aqueous ammonium acetate solution.

* * * * *